(12) United States Patent
Kato

(10) Patent No.: US 6,946,199 B2
(45) Date of Patent: Sep. 20, 2005

(54) OPTICAL, ADDITIONAL FILMS AND OPTICAL ELEMENTS

(75) Inventor: Hideo Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 09/910,928

(22) Filed: Jul. 24, 2001

(65) Prior Publication Data

US 2002/0035024 A1 Mar. 21, 2002

(30) Foreign Application Priority Data

Jul. 27, 2000 (JP) ........................................ 2000-227080

(51) Int. Cl.$^7$ .............................................. B32B 15/00
(52) U.S. Cl. ...................... 428/432; 428/221; 428/428; 428/446; 428/630; 428/701; 428/704; 428/696; 428/699; 428/631; 359/355; 359/359; 359/649; 501/54
(58) Field of Search ................................ 428/428, 432, 428/696, 699, 631, 704, 446, 701, 630, 221; 359/355, 649, 359; 501/54

(56) References Cited

U.S. PATENT DOCUMENTS

| | | | | |
|---|---|---|---|---|
| 5,028,967 A | * | 7/1991 | Yamada et al. | ............. 359/355 |
| 5,679,125 A | | 10/1997 | Hiraiwa et al. | ................ 65/397 |
| 5,847,876 A | * | 12/1998 | Ferrante et al. | |
| 5,952,084 A | * | 9/1999 | Anderson et al. | ............ 428/212 |
| 5,958,809 A | * | 9/1999 | Fujiwara et al. | ............... 501/54 |
| 6,224,976 B1 | * | 5/2001 | Takushima et al. | ..... 428/355 R |
| 6,242,136 B1 | * | 6/2001 | Moore et al. | .................. 430/5 |
| 6,421,188 B1 | * | 7/2002 | Maehara | ..................... 359/741 |
| 6,466,365 B1 | * | 10/2002 | Maier et al. | ................ 359/355 |
| 6,707,616 B1 | * | 3/2004 | Takahashi et al. | .......... 359/649 |

FOREIGN PATENT DOCUMENTS

| | | |
|---|---|---|
| EP | 1031877 A1 * | 11/1998 |
| JP | 11-305419 | 11/1999 |
| JP | 2000-089450 | 3/2000 |
| JP | 2000-292908 | 10/2000 |
| WO | WO 99/24869 | 5/1999 |

OTHER PUBLICATIONS

Abstract of JP 61159602, Jul. 19, 1986; Abstract of JP 07244202 A, Sep. 19, 1995.*

* cited by examiner

*Primary Examiner*—Rena Dye
*Assistant Examiner*—Tamra L. Dicus
(74) *Attorney, Agent, or Firm*—Fitzpatrick, Cella, Harper & Scinto

(57) ABSTRACT

A monolayer or multilayer film has a single layer or multiple layers of silica containing fluorine. An optical element has the forgoing film laid on a surface of a substrate. A concentration of the fluorine in the layer or layers of silica is not less than 0.1 mol % (referably, not less than 1 mol %) nor more than 10 mol %.

3 Claims, 3 Drawing Sheets

OPTICAL, ADDITIONAL FILMS AND OPTICAL ELEMENTS

BACKGROUND OF THE INVENTION

1. Field of the Invention

The present invention relates to optical, additional films suitably used, for example, in vacuum ultraviolet lithography, particularly, in $F_2$ laser lithography, optical elements in which the optical, additional film or films are added on a substrate, and an optical apparatus using the optical element or elements.

The optical, additional films herein are, for example, antireflection coatings, reflective coatings, or protective coatings, formed on surfaces of optical elements.

2. Related Background Art

Conventional i-line (wavelength 365 nm) and KrF laser (wavelength 248 nm) lithographies, glass materials for optical elements such as lenses, antireflection coating materials, environments, etc. that were applicable to optical systems of optical apparatuses, such as a projection exposure apparatus, illumination apparatus, measuring apparatus, etc., used in lithographies, were a direct extension of the conventional technologies and could be prepared by conventional methods.

As for the lithography in the vacuum ultraviolet region, however, oxygen, water, etc. strongly absorbs light. Thus, it is necessary to keep an atmosphere under vacuum or to replace it with a gas such as nitrogen or helium.

In the ArF laser lithography at the wavelength of 193 nm, conventionally used silica and fluorite were applicable as glass materials and antireflection coating materials and it was also possible to select certain kinds of metal fluorides and oxides.

Silica ($SiO_2$) has been used heretofore as a material for optical elements for an ArF laser. It was because silica ($SiO_2$) has a high transmittance of 90% for an ArF excimer laser light and is stable upon variations in temperature, humidity, and so on. However, the transmittance of silica ($SiO_2$) is substantially lower for the $F_2$ laser light having the wavelength of 157 nm, and it is impossible to use silica as an optical material.

On the other hand, in the $F_2$ laser lithography, only fluorite ($CaF_2$) is applicable as a glass material capable of sufficiently transmitting rays at the wavelength of 157 nm, which hinders the design of optical systems.

Further, the $F_2$ laser lithography also involves a problem concerning optical, additional films, such as the antireflection coatings or the like. In general, the antireflection coatings are formed in a multilayer structure of a combination of a material having a refractive index smaller than that of the substrate with a material having a refractive index higher than that of the substrate, thereby yielding a stronger antireflection effect than that of the antireflection coatings of a monolayer structure.

However, no material with a refractive index higher than that of fluorite has yet been found as a material for antireflection coatings, so that magnesium fluoride ($MgF_2$) or lithium fluoride (LiF) with the refractive index lower than that of fluorite had to be used in monolayer structures in the $F_2$ laser lithography. Therefore, there is a need for a material having a refractive index higher than that of fluorite and being capable of making the optical, additional films (antireflection coatings, reflective coatings, protective coatings) of a multilayer structure in combination with $MgF_2$ or LiF that can be used in $F_2$ laser lithography.

Japanese Patent Application Laid-Open No. 2000-89450 (Application No. 10-272570) suggests reticle materials applicable to the $F_2$ laser lithography. They are crystals of metal fluorides such as $MgF_2$, LiF, and $CaF_2$, which are used so that the crystallographic axis is oriented in a specific direction.

SUMMARY OF THE INVENTION

It is thus an object of the present invention to provide optical, additional films (antireflection coatings, reflective coatings, protective coatings, etc.) and optical elements applicable to the $F_2$ laser lithography.

The inventor conducted extensive and intensive research in order to solve the above problems and succeeded in developing effective element techniques for a breakthrough improvement in performance of the optical systems of the optical apparatus such as the projection exposure apparatus, illumination apparatus, measurement apparatus, etc. used in the $F_2$ laser lithography and, in turn, contributed to the improvement in microprocessing and productivity of semiconductors.

One aspect of the present invention is a film comprising at least one layer of silica ($SiO_2$) containing fluorine (F).

In the film, preferably, a concentration of the fluorine in the layer or layers of silica is not less than 0.1 mol % (preferably, not less than 1 mol %) nor more than 10 mol %.

In the film, preferably, a refractive index of the layer or layers of silica for $F_2$ laser light is 1.60–1.80.

Preferably, the film comprises a layer a material of which is selected from the group consisting of $MgF_2$, LiF, and $Na_3AlF_6$.

Another aspect of the invention is an optical element wherein the film as set forth is added on a surface thereof.

In the optical element, preferably, said optical element is comprised of fluorite.

In the optical element, preferably, said optical element is comprised of silica containing fluorine.

In the optical element, preferably, said film is an antireflection coating.

Another aspect of the invention is an optical apparatus for vacuum ultraviolet lithography, comprising the optical element as set forth.

Another aspect of the invention is a device fabrication method comprising a step of exposing a wafer to a device pattern by the optical apparatus as set forth, and a step of developing the wafer thus exposed.

DETAILED DESCRIPTION OF THE PREFERRED EMBODIMENTS

Figure 1:
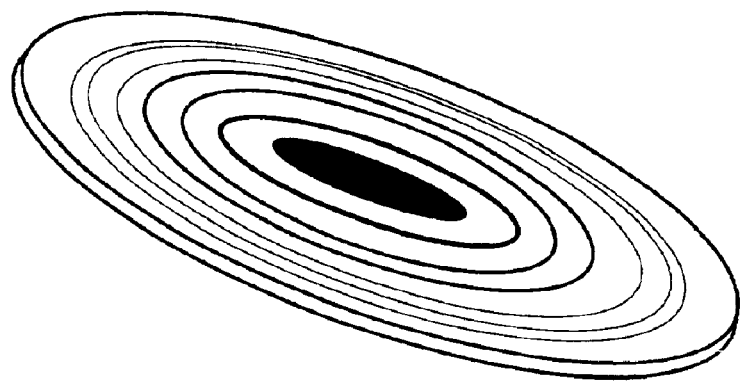
FIG. 1 is a schematic view of a BO lens.

We propose here that silica containing fluorine (which will be also referred to hereinafter as "$SiO_2$:F") is used as a material for the optical films (additional films) (e.g., antireflection coatings, reflective coatings, or protective coatings) added on the substrate of the optical elements for the $F_2$ laser lithography.

The inventor succeeded in dramatically raising the transmittance of silica films for the $F_2$ laser light by adding a predetermined amount of fluorine to the silica films. A nondoped silica film 1 m thick has the transmittance of not more than 10% for the $F_2$ laser light, whereas a silica film doped with about 1 mol % of fluorine has the transmittance raised to about 90% for the $F_2$ laser light.

In general, materials used in the optical elements for photolithography are required to have a transmittance of 90% or more for a light of a specific wavelength. Silica films doped with fluorine have transmittances greater than that for the $F_2$ laser light and thus can be used as materials for the optical, additional films for the $F_2$ laser light.

The film of silica containing fluorine desirably has the transmittance of 90% or more for the $F_2$ laser light of 157 nm when the thickness thereof is 1 μm. Further, the transmittance is more desirably not less than 95% and most desirably not less than 99%.

The film of silica containing fluorine desirably has at least the refractive index higher than that of fluorite. This is because the refractive index (n) of fluorite is about 1.56 for the $F_2$ laser light having the wavelength of 157 nm, and it becomes feasible to make a more efficient, optical, additional film by employing a layered structure with either of $MgF_2$ (n=1.47), LiF (n=1.49), and $Na_3AlF_6$ (n=1.48) having the refractive indices lower than that of fluorite.

More specifically, the refractive index of the $SiO_2$:F film is desirably 1.6 to 1.8.

As an example, the refractive index of the $SiO_2$:F film containing 1 mol % of fluorine for the $F_2$ laser light is 1.65 and this $SiO_2$:F film can be combined with an LiF film or an $MgF_2$ film to obtain an efficient, optical, thin film (multilayer film) (reference is made to examples).

For using the silica containing fluorine ($SiO_2$:F) as an antireflection coating or a reflective coating for the $F_2$ laser lithography, a content of fluorine in the silica film is desirably 0.1 mol % to 10 mol %.

When the concentration of fluorine is not less than 10 mol %, the silica film containing fluorine has a practically allowable transmittance for the $F_2$ laser light. When the fluorine concentration is not more than 10 mol %, it is possible to maintain stable, optical characteristics (refractive index, transmittance, etc.) and film properties.

The fluorine content is more desirably in the range of not less than 1 mol % nor more than 10 mol %.

In the fluorine-containing silica as a material for the optical, additional films (antireflection coatings, reflective coatings, protective coatings) or as a material for the optical elements, fluorine is desirably present everywhere at a constant concentration. If fluorine is scattered at a constant concentration in the in-plane and depth directions, there will not be any location-dependent fluctuations in the optical characteristics and film properties, including the refractive index and the transmittance.

A method of forming the fluorine-containing silica film can be selected arbitrarily from well-known methods that can form the silica film and make the silica film contain fluorine in the aforementioned concentration range.

For example, such conventional methods include chemical vapor deposition (CVD), sputter deposition, ion beam sputtering deposition, reactive sputtering deposition, electron beam evaporation, and so on.

When the fluorine-containing silica ($SiO_2$:F) film is formed by these methods, it is important to avoid dispersion of fluorine concentration (in the in-plane and depth directions) in the film.

For example, when the film is formed by the reactive sputtering deposition method, a sputter target is desirably silica ($SiO_2$) or fluorine-containing silica ($SiO_2$:F). Sputter gas is desirably an inert gas (Ar, Ne, He, Kr, or the like) and reaction gas desirably fluorine gas ($F_2$).

When the film is formed by sputter deposition, it is desirable to preliminarily prepare a target of silica doped with fluorine ($SiO_2$:F) by another method, use an inert gas (Ar, Ne, He, Kr, or the like) as the sputter gas, and implement sputtering of the target.

In the film-forming methods utilizing sputtering, the composition of the deposited film often differs from the composition of the target due to the influence of selective sputtering or the like. Thus, it is desirable to supplement fluorine in order to obtain the film with the desired fluorine concentration.

One form of the optical, additional films according to the present invention is a multilayer film consisting of a stack of alternate films being a combination of the fluorine-containing silica ($SiO_2$:F) film with a metal fluoride, specifically, either of $MgF_2$, LiF, $Na_3AlF_6$, $CaF_2$, $LaF_2$, $BaF_2$, SrF, and so on.

Particularly, the optical, additional films for the $F_2$ laser lithography are more desirably a stack structure of $SiO_2$:F and LiF, $Na_3AlF_6$, or $CaF_2$ films.

Examples of the stack structure of the optical, additional films for the F2 laser lithography will be presented below. When the films are formed in a two-layer structure, desirable structures are $MgF_2$ (265 Å)/$SiO_2$:F (238 Å)/fluorite (optical element), LiF (265 Å)/$SiO_2$:F (238 Å)/fluorite (optical element), and $Na_3AlF_6$ (265 Å)/$SiO_2$:F (238 Å)/fluorite (optical element). The thickness of each layer indicated by ( . . . Å) was determined according to the condition for an interference film at 157 nm (the wavelength of $F_2$ laser light).

When the films are formed in a four-layer structure, desirable structures are $MgF_2$ (434 Å)/$SiO_2$:F (238 Å)/$MgF_2$ (434 Å)/$SiO_2$:F (238 Å)/fluorite (optical element), LiF (434 Å)/$SiO_2$:F (238 Å)/LiF (434 Å)/$SiO_2$:F (238 Å)/fluorite (optical element), and $Na_3AlF_6$ (434 Å)/$SiO_2$:F (238 Å)/Na3AlF6 (434 Å)/$SiO_2$:F (238 Å)/fluorite (optical element). The thickness of each layer was also determined according to the condition for an interference film at 157 nm (the wavelength of $F_2$ laser light).

The optical, additional films of the present invention are not only added to the surfaces of lenses, but can also be added to the surfaces of diffraction gratings, mirrors, and filters, whereby a remarkable improvement in diffraction efficiency and an increase in reflectance can be expected.

These optical elements (diffraction gratings, lenses, mirrors, filters) with the optical, additional films are also one aspect of the present invention.

The optical apparatus using these optical elements as components are also one aspect of the present invention. The optical apparatus herein embraces the projection exposure apparatus, illumination apparatus, measurement apparatus, and so on used in the $F_2$ laser lithography.

The present invention will be described hereinafter in further detail with examples thereof.

EXAMPLE 1

A circular BO (Binary Optics) lens having the diameter of 20 mm was made.

The BO lens herein is a kind of diffraction grating and the diffraction grating is normally used as a spectroscopic element of a spectroscope in the optical apparatus for fabrication of semiconductors. The BO lens has a step-wise diffraction grating and is expected to be applied to optical systems using ultraviolet light because of its potential for achromatism and an aspheric effect.

The present BO lens is designed to work at the wavelength of the $F_2$ laser light of 157 nm and has about 1800 rings. Each ring has a step-wise structure of eight steps.

Figure 2A:
FIGS. 2A and 2B are cross-sectional views of an 8-step BO lens.
Figure 2B:

FIG. 1 and FIGS. 2A and 2B are schematic views of the BO lens and the step-wise structure of the rings thereof, respectively. The outermost ring has such designed values, that the width of each step is 0.35 m, the height of each step 0.04 $\mu$m, and the width and height of the ring are 2.8 $\mu$m and 0.28 $\mu$m, respectively. FIG. 2A is a partial magnification of FIG. 2B.

Figure 3:
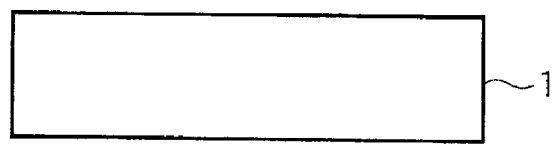
FIG. 3 is a BO lens substrate before production of a BO lens.

This BO lens was fabricated in such a way that a fluorite substrate 1 with a diameter of 2 inches and a thickness of 4 mm, as shown in FIG. 3, was prepared. Patterns of chromium masks (11 to 13) having different intervals were successively printed as reduced images in respective, negative photoresists coated on the substrate 1, using a stepper for KrF ($\lambda$=248 nm). Each photoresist was developed after printing to obtain a resist pattern, and the substrate 1 was etched by a dry etching method using the resultant resist patterns as masks. Gas for the dry etching was a mixture of argon and hydrogen.

Figure 4:
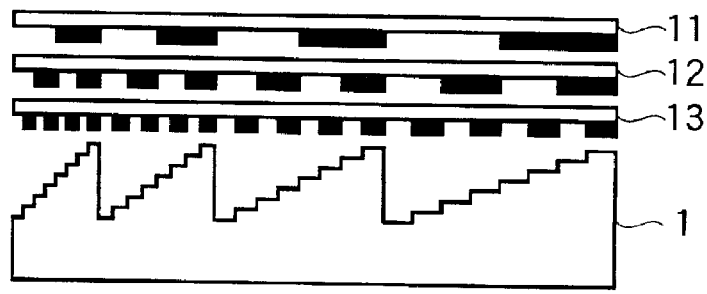
FIG. 4 is a cross-sectional view of a BO lens and three masks used in production of the BO lens.

FIG. 4 is an explanatory drawing simultaneously showing the three masks (11 to 13) successively used for the fabrication of the present BO lens, together with the lens. The above process was repeated three times while changing the masks, thereby making the BO lens of the step-wise structure with rings each consisting of eight steps.

Figure 5:
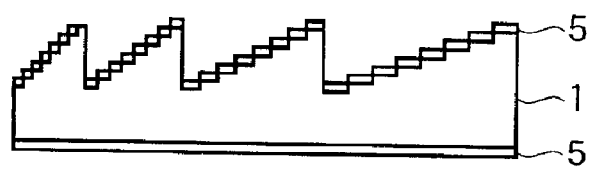
FIG. 5 is a cross-sectional view of a BO lens with antireflection coatings of the present invention deposited on a front surface and a back surface.

In the present invention, antireflection coatings consisting of alternate layers of $SiO_2$:F layers were laid on the front surface and on the back surface of the BO element fabricated as described above (FIG. 5).

The coatings were formed by the reactive sputtering deposition method. The sputtering target was a synthetic quartz sheet. The film-forming system was a sputtering deposition system of a RF type (model SBR-110 available from Ulvac Inc.).

The sputtering deposition was carried out under the conditions described in Table 1.

In order to evaluate the physical properties of the $SiO_2$:F films of the present invention, a flat plate substrate (hereinafter referred to as a test sample) made of the same material as the BO element was also introduced into the deposition chamber and subjected to deposition at the same time.

TABLE 1

| Deposition Conditions | Values |
| --- | --- |
| sputtering target | $SiO_2$ |
| pressure in deposition chamber | 4 Pa |

TABLE 1-continued

| Deposition Conditions | Values |
| --- | --- |
| substrate temperature (temperature of BO element) | 22° C. |
| sputter gas and reaction gas | 10 vol % $F_2$-containing Ar gas, 20 sccm |
| deposition time | 7.6 min |
| frequency of applied RF power | 13.56 MHz |
| applied RF power | 100 W |

Evaluation was made for the physical properties of the $SiO_2$:F films thus deposited on the BO element. This evaluation of the physical properties was conducted with the test sample.

Cross-sections of the test sample were observed with a scanning electron microscope, and it was found from the observation that the thickness of the $SiO_2$:F films was 238 Å.

The concentration of fluorine (F) in the $SiO_2$:F films was evaluated by Raman spectroscopy, and the fluorine concentration was approximately 1 mol %. Further, a depth profile analysis by SIMS (Secondary ion mass spectrometry) was performed to obtain a profile of F in the depth direction in the $SiO_2$:F films, and it was verified that F was distributed at a constant concentration in the $SiO_2$:F films.

The refractive index of the $SiO_2$:F films was measured at the wavelengths of 200 to 300 nm with an ellipsometer and the refractive index was approximately 1.65 for the $F_2$ laser light (at the wavelength of 157 nm) from extrapolation of the measurement results.

After completion of the deposition of the $SiO_2$:F films, lithium fluoride (LiF) was then deposited subsequently without taking the substrate out of the deposition system. The deposition conditions are presented in Table 2.

TABLE 2

| Deposition Conditions | Values |
| --- | --- |
| sputtering target | LiF |
| pressure in deposition chamber | 2 Pa |
| substrate temperature (temperature of BO element) | 22° C. |
| sputter gas and reaction gas | 10 vol % $F_2$-containing Ar gas, 10 sccm |
| deposition time | 9.7 min |
| frequency of applied RF power | 13.56 MHz |
| applied RF power | 100 W |

The physical properties of the LiF films thus deposited were also evaluated with the test sample.

Cross-sections of the test sample were observed with the scanning electron microscope and the thickness of the LiF film was 263 Å.

The diffraction efficiency of this BO element was measured with a diffraction efficiency measuring system, and the BO element demonstrated an average improvement of 14% in diffraction efficiency, as compared with elements without the antireflection coatings.

EXAMPLE 2

Figure 6:
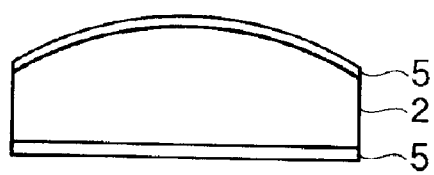
FIG. 6 is a cross-sectional view of a lens with antireflection coatings of the present invention.

Antireflection coatings 5 having the structure of "$MgF_2$/$SiO_2$:F/lens surface" were deposited on surfaces of a fluorite lens 2 for the $F_2$ laser light having the wavelength of 157 nm (FIG. 6). The lens 2 is for the $F_2$ lithography. It has a lens diameter of 100 mm and its largest thickness is 10 mm.

In the present example, 238 Å thick $SiO_2$:F films were deposited by sputtering a target of fluorine-containing silica by RF sputtering. The deposition conditions of the $SiO_2$:F films in the present example are presented in Table 3.

TABLE 3

| Deposition Conditions | Values |
| --- | --- |
| sputtering target | $SiO_2$:F |
| pressure in deposition chamber | 2 Pa |
| substrate temperature (temperature of lens) | 22° C. |
| sputter gas and reaction gas | Ar gas, 10 sccm |
| deposition time | 6.9 min |
| frequency of applied RF power | 13.56 MHz |
| applied RF power | 100 W |

The concentration of fluorine (F) in the $SiO_2$:F films was evaluated by Raman spectroscopy, and the fluorine concentration was approximately 1 mol %. Further, the depth profile analysis by SIMS (Secondary ion mass spectrometry) was performed to obtain a profile of fluorine in the depth direction in the $SiO_2$.F films, and it was verified that fluorine was distributed at a constant concentration in the $SiO_2$:F films.

The refractive index of the $SiO_2$:F films was measured at the wavelengths of 200 to 300 nm with the ellipsometer, and the refractive index was approximately 1.65 at the wavelength of 157 nm of the $F_2$ laser light from an extrapolation of the measurement results.

Further, 263 Å thick magnesium fluoride ($MgF_2$) films were deposited as upper layers by similar means. The deposition conditions at that time are presented in Table 4.

TABLE 4

| Deposition Conditions | Values |
| --- | --- |
| sputtering target | $MgF_2$ |
| pressure in deposition chamber | 2 Pa |
| substrate temperature (temperature of lens) | 22° C. |
| sputter gas and reaction gas | Ar gas, 10 sccm |
| deposition time | 19 min |
| frequency of applied RF power | 13.56 MHz |
| applied RF power | 100 W |

Similarly, an antireflection coating 5 of two layers was also laid on the back surface of the lens 2.

The transmittance of the complete lens was measured for the $F_2$ laser light of 157 nm, and the transmittance in the central portion improved by about 8%.

EXAMPLE 3

Figure 7:
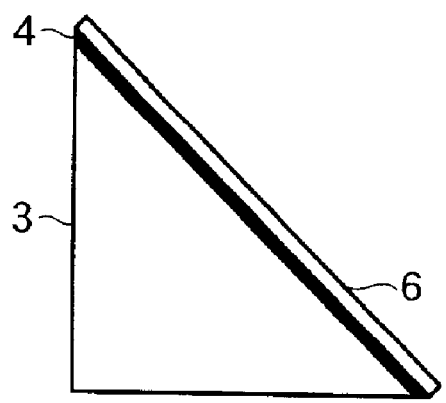
FIG. 7 is a view showing a mirror with a reflective film of the present invention on a surface.

A film having the structure of "$MgF_2$/$SiO_2$:F/mirror surface" was laid as a reflective coating 6 on a surface of a reflecting mirror used in an optical path of a spectrophotometer (FIG. 7).

A fluorine-containing silica ($SiO_2$:F) film was deposited as a 265 Å thick reflective coating 6 on an aluminum (Al) deposited film 4 formed on a glass substrate 3, using the sputtering system similar to that used in Example 1. The thickness (265 Å) of this film 6 was determined from the condition of the interference film for rays of 157 nm.

The deposition conditions of the $SiO_2$:F film are the same as in Example 1.

The deposition conditions of the $MgF_2$ film are presented in Table 5.

TABLE 5

| Deposition Conditions | Values |
| --- | --- |
| sputtering target | $MgF_2$ |
| pressure in deposition chamber | 2 Pa |
| substrate temperature (temperature of reflecting mirror) | 22° C. |
| sputter gas and reaction gas | 10 vol % $F_2$-containing Ar gas, 10 sccm |
| deposition time | 11.1 min |
| frequency of applied RF power | 13.56 MHz |
| applied RF power | 100 W |

The reflectance of the reflection-enhanced mirror (FIG. 7) obtained in this manner was measured, and it was verified that the reflectance was enhanced by 7% at the angle of incidence of 45° for the $F_2$ laser light.

There was no alternative but to use an Al film in an exposed state for the conventional mirrors for the $F_2$ laser light. The reason was that if an optical, additional film was laid on the surface, the reflectance of the mirror was substantially decreased. For this reason, useful lives of conventional mirrors are short, and these mirrors have to be frequently replaced.

However, it became feasible to at least double the useful life of the conventional mirror by laying the optical, additional film of the present invention on the surface of the Al mirror.

EXAMPLE 4

The lens of the same shape as in Example 3 was made of silica containing 4 mol % of flourine ($SiO_2$:F). Further, antireflection coatings 5 having the stack structure of four layers of "LiF/$SiO_2$:F/LiF/$SiO_2$:F/lens surface" were formed on the lens surfaces (on the front surface and on the back surface). The deposition conditions of $SiO_2$:F and LiF were the same as in Example 1.

The concentration of fluorine (F) in the $SiO_2$:F films was evaluated by Raman spectroscopy, and the fluorine concentration was approximately 1 mol %. Further, the depth profile analysis by SIMS (Secondary ion mass spectrometry) was performed to obtain a profile of fluorine in the depth direction in the $SiO_2$:F films, and it was verified that fluorine was distributed at a constant concentration in the $SiO_2$:F films.

The refractive index of the $SiO_2$:F films was also measured at the wavelengths of 200 to 300 nm with the ellipsometer, and the refractive index was approximately 1.65 at the wavelength of 157 nm of the $F_2$ laser light, from extrapolation of the measurement results.

The transmittance of the lens of the present example was measured for the $F_2$ laser light, and it was verified therefrom that the transmittance was improved by about 8%.

EXAMPLE 5

The optical, additional films were made by resistance heating evaporation, instead of the film forming methods of the fluorine-containing silica ($SiO_2$:F) films, magnesium fluoride ($MgF_2$) films, and lithium fluoride (LiF) films in Examples 1, 2, and 3. The present example also confirmed the improvement in the diffraction efficiency of the BO lens, the improvement in the transmittance of the lens, and the enhancement of reflectance of the mirror as in Examples 1, 2, and 3.

EXAMPLE 6

Figure 8:
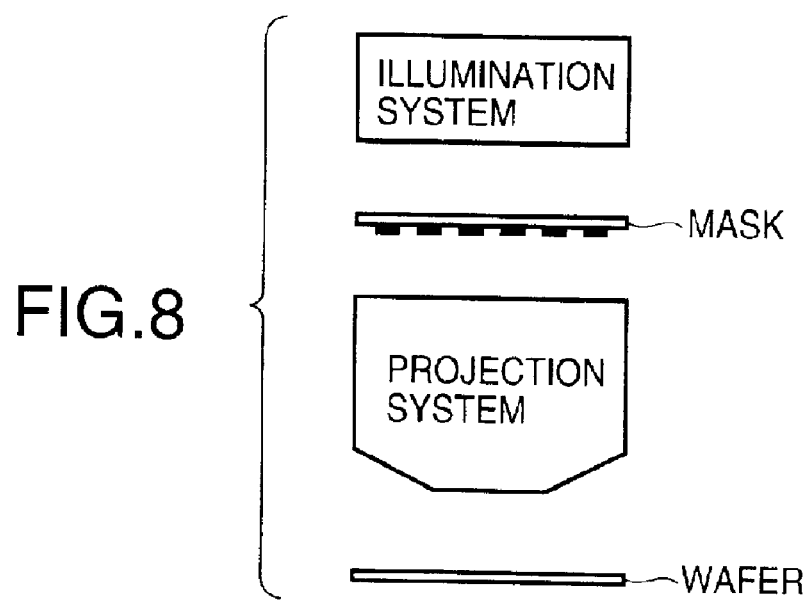
FIG. 8 is a drawing showing an embodiment of the optical apparatus according to the present invention.

The antireflection coatings as made in Example 5 were laid on surfaces of optical elements (lenses, mirrors, diffraction gratings) used in the optical systems of the projection exposure apparatus (steppers or scanners) for fabrication of semiconductors using the $F_2$ laser for printing. As a result, the lenses demonstrated about an 8% increase in transmittance. The mirrors showed about at 8% increase in reflectance. The diffraction gratings demonstrated an about 15% increase in diffraction efficiency. FIG. 8 is a schematic view of this projection exposure apparatus. The optical, additional films of the present invention are used in the optical elements of its illumination system and/or in the optical elements of its projection system and/or in the optical elements of masks and the like.

The transmittance of the entire projection exposure apparatus was improved for the $F_2$ laser light by virtue of the effect of the optical, additional films laid on these optical elements. Thus, it became feasible to fabricate the semiconductor devices at a greater density than before.

What is claimed is:

1. An optical element having a film on its surface, said film comprising at least one layer of silica doped with fluorine and a layer of a material selected from the group consisting of $MgF_2$, LiF, and $Na_3AlF_6$, wherein a refractive index of the layer or layers of silica for $F_2$ laser light is 1.60 to 1.80.

2. The optical element according to claim 1, wherein said element is comprised of fluorite.

3. The optical element according to claim 1, wherein said film is an antireflection coating.

* * * * *

UNITED STATES PATENT AND TRADEMARK OFFICE
CERTIFICATE OF CORRECTION

PATENT NO. : 6,946,199 B2
DATED : September 20, 2005
INVENTOR(S) : Hideo Kato

It is certified that error appears in the above-identified patent and that said Letters Patent is hereby corrected as shown below:

Title page,
Item [57], ABSTRACT,
Line 3, "forgoing" should read -- foregoing --.

Column 3,
Line 12, "1 m" should read -- 1 $\mu$m --;
Line 46, "10 mol" should read -- 0.1 mol % --; and
Line 47, "%" should be deleted.

Column 4,
Line 36, "F2" should read -- $F_2$ --; and
Line 50, "Å/Na3AlF6" should read -- Å/$Na_3AlF_6$ --.

Column 5,
Line 21, "0.35 m" should read -- 0.35 $\mu$m --.

Column 9,
Line 8, "at" should read -- an --; and
Line 9, "an about" should read -- about a --.

Signed and Sealed this

Seventh Day of March, 2006

JON W. DUDAS
*Director of the United States Patent and Trademark Office*